(12) United States Patent
Aso et al.

(10) Patent No.: US 8,291,467 B2
(45) Date of Patent: Oct. 16, 2012

(54) INFORMATION PROCESSING APPARATUS, INFORMATION MANAGEMENT METHOD, AND STORAGE MEDIUM THEREFOR

(75) Inventors: Takamichi Aso, Tokyo (JP); Hidemi Sasaki, Kawasaki (JP)

(73) Assignee: Canon Kabushiki Kaisha (JP)

(*) Notice: Subject to any disclaimer, the term of this patent is extended or adjusted under 35 U.S.C. 154(b) by 1157 days.

(21) Appl. No.: 12/140,260

(22) Filed: Jun. 16, 2008

(65) Prior Publication Data
US 2009/0007224 A1 Jan. 1, 2009

(30) Foreign Application Priority Data
Jun. 29, 2007 (JP) .................................. 2007-173089

(51) Int. Cl.
*G06F 17/00* (2006.01)
(52) U.S. Cl. ............................. 726/1; 713/165; 380/201
(58) Field of Classification Search ...... 726/1; 713/165; 380/201
See application file for complete search history.

(56) References Cited

U.S. PATENT DOCUMENTS
5,842,214 A * 11/1998 Whitney et al. .......................... 1/1
7,650,627 B1 * 1/2010 Stancheva et al. ................ 726/1

FOREIGN PATENT DOCUMENTS
JP 11-227267 A 8/1999

OTHER PUBLICATIONS
JPO, Feb. 3, 2012, English translated Decision to Grant a Patent to JP2007-173089 by JPO Patent Examiner.*

* cited by examiner

*Primary Examiner* — April Shan
(74) *Attorney, Agent, or Firm* — Rossi, Kimms & McDowell LLP

(57) ABSTRACT

An image forming apparatus capable of flexibly setting a security policy for a modified file. A client terminal generates a print job added with a new security policy for a second file generated from a first file, and delivers the print job added with the new security policy to the image forming apparatus. The image forming apparatus generates intermediate data based on the print job delivered from the client terminal, and causes a second policy server to register the security policy. The second policy server registers the security policy, while items of the security policy being appropriately assigned to the first and second policy servers. The second policy server generates an encryption key. The image forming apparatus encrypts the intermediate data using the encryption key, and stores the encrypted intermediate data.

10 Claims, 18 Drawing Sheets

FIG. 15

| | | EDITING | COPYING | PRINTING | OFFLINE |
|---|---|---|---|---|---|
| USER AND GROUP | ISSUER | ○ | ○ | ○ | ○ |
| | READER | × | × | × | × |

NAME [NAME OF POLICY]
EXPLANATION [DETAILED EXPLANATION]
EXPIRATION DATA [yyyy/mm/dd hh:mm:ss] [yyyy/mm/dd hh:mm:ss]
INSPECTION [TRACE DOCUMENT EVENT]
OFFLINE TIME [10] DAYS
ENCRYPTION [ENCRYPT ALL DOCUMENTS]
DYNAMIC WATERMARK [ADD DYNAMIC WATERMARK]

FIG. 16

| | |
|---|---|
| COLOR PRINTING | MONOCHROME ONLY ▷ |
| PAGE LAYOUT | 2 PAGES/SHEET ▷ |
| DOUBLE-SIDED PRINTING | DOUBLE-SIDED PRINTING ALONE ▷ |
| LIMITATION ON EDITING | ONLY ADDITION PERMITTED ▷ |
| PERIOD FOR EDITING | yyyy/mm/dd hh:mm:ss ~ yyyy/mm/dd hh:mm:ss |
| RANGE OF EDITING | PAGE 1 TO PAGE 10 |
| FONT REPLACEMENT | PERMITTED ▷ |
| TRANSMISSION FUNCTION | PROHIBITED ▷ |

INFORMATION PROCESSING APPARATUS, INFORMATION MANAGEMENT METHOD, AND STORAGE MEDIUM THEREFOR

BACKGROUND OF THE INVENTION

1. Field of the Invention

The present invention relates to an information processing apparatus for information security management in information processing, an information management method for the apparatus, and a storage medium that computer-readably stores a program for causing a computer to carry out the method.

2. Description of the Related Art

In recent years, computerized documents (hereinafter referred to as electronic documents) have frequently been used. Electronic documents are very convenient in that they can easily be transmitted and distributed by way of e-mail attachments. On the other hand, the ease of distribution of electronic documents raises new problems such as leakage of information.

Currently, there has been introduced a technique of protecting PDF (portable document format) and other files by means of settings (hereinafter referred to as security policy) that provide limitations on displaying, editing, printing, and other operations on the files, so that only valid users may be able to carry out printing and other operations on the files.

In some image forming apparatus, print job data transmitted from a client terminal via a network is converted into vector or bitmap data, and intermediate data for use in printing is generated. The intermediate data is sometimes stored as a file in a hard disk of the image forming apparatus for the purpose of being edited, transmitted to another apparatus, reprinted, and so on. The function of storing the intermediate data as a file in the hard disk of the image forming apparatus for reuse purpose is called a box function, and a file system therefor is called a box.

Some of the files stored in the box include secrete information. Preferably, therefore, these files be protected by a security policy as in the original files. In an image forming apparatus disclosed in Japanese Laid-open Patent Publication No. 11-227267, a password is set for the box to permit only valid users to access files in the box.

First files protected on a computer such as a client terminal by a security policy are sometimes stored as second files in an image forming apparatus by means of the box function or the like. At that time, unlike the first files, the second files cannot sufficiently be protected by the security policy. Certainly, the second files stored in the box disclosed in Japanese Laid-open Patent Publication No. 11-227267 can be protected by use of a password. However, if some second file is transmitted to another apparatus for reuse purpose or the like, it is difficult to protect the second file by means of the password.

In addition, if an item different from security policy items of the first file is added to the second file, a limitation cannot be provided on the newly added item.

In a case where the security policy is changed, it is preferable to maintain the consistency between the original security policy items and the newly added item.

SUMMARY OF THE INVENTION

The present invention provides an information processing apparatus capable of flexibly setting a security policy for a modified file, an information management method for the apparatus, and a storage medium that computer-readably stores a program for causing a computer to carry out the method.

According to a first aspect of this invention, there is provided an information processing apparatus configured to be able to communicate with a policy server that manages a first security policy on at least one file, comprising a management unit configured to manage a second security policy on at least one file, a first return unit configured, in response to acceptance of an acquisition request from a requestor for acquisition of security policy on at least one first file on which the first security policy is set, to make a request to the policy server to acquire the security policy on the first file, and configured to send back to the requester the security policy sent back to the first return unit from the policy server in response to the request from the first return unit, and a second return unit configured, in response to acceptance of a request from the requester for acquisition of security policy on at least one second file on which the second security policy is set, to acquire the second security policy from the management unit and send the acquired second security policy back to the requester.

According to a second aspect of this invention, there is provided an information management method for an information processing apparatus configured to be able to communicate with a policy server that manages a first security policy on at least one file, comprising a management step of managing a second security policy on at least one file, a first return step of, in response to acceptance of an acquisition request from a requester for acquisition of security policy on at least one first file on which the first security policy is set, making a request to the policy server to acquire the security policy on the first file, and sending back to the requester the security policy sent back from the policy server in response to the request, and a second return step of, in response to acceptance of an acquisition request from a requester for acquisition of security policy on at least one second file on which the second security policy is set, acquiring the second security policy managed in the management step and sending the acquired second security policy back to the requester.

According to a third aspect of this invention, there is provided a storage medium that computer-readably stores a program for causing a computer the information processing apparatus according to the second aspect of this invention.

With the present invention, it is possible to flexibly set a security policy for a modified file.

Further features of the present invention will become apparent from the following description of exemplary embodiments with reference to the attached drawings.

BRIEF DESCRIPTION OF THE DRAWINGS

FIG. 15 is a view showing an example of a first security policy setting screen;

FIG. 16 is a view showing an example of a second security policy setting screen;

DETAILED DESCRIPTION OF THE PREFERRED EMBODIMENTS

The present invention will now be described in detail below with reference to the drawings showing preferred embodiments thereof.

First Embodiment

Figure 1:
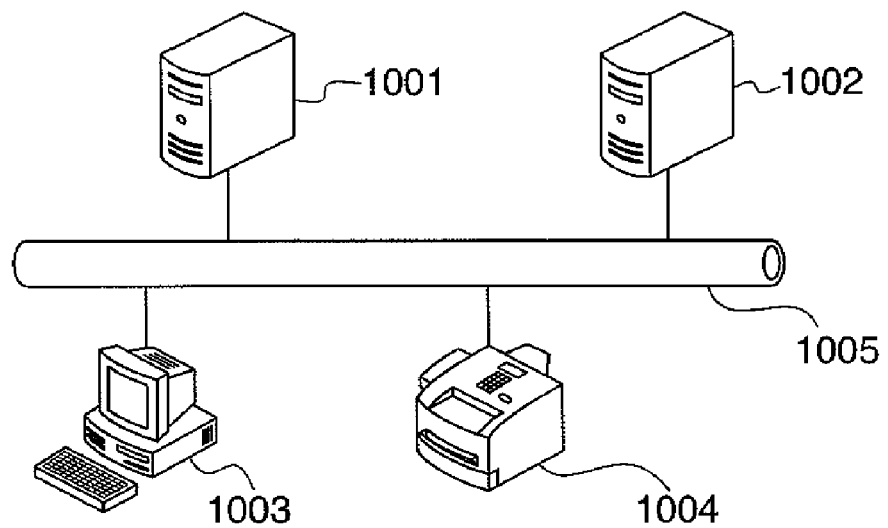
FIG. 1 is a view showing the entire construction of an information processing system to which the present invention is applied.

FIG. 1 schematically shows the construction of an information processing system to which the present invention is applied. As shown in FIG. 1, the information processing system includes a first policy server 1001, a second policy server 1002, a client terminal 1003, and an image forming apparatus 1004, which are connected to one another via a network 1005. There may be provided a plurality of client terminals 1003 and a plurality of image forming apparatuses 1004.

The first policy server 1001 is a computer for use in registration and management of at least one security policy each of which is set for at least one first file. The second policy server 1002 is a computer for use in registration and management of at least one security policy each of which is set for at least one second file.

The first files are source files from which the second files are formed. The second files can be obtained by subjecting the first files to some processing or alteration, such as conversion in data format or file format, editing, and correction (including addition, deletion, or the like).

It is assumed in this embodiment that the first files relate to document data created by the client terminal 1003 or acquired or edited by the client terminal 1003 via the network 1005, and the second files relate to raster image data, converted from the document data, for being printed by the image forming apparatus 1004 or the like. The security policies are, for example, to provide limitations on displaying, editing, printing, transmitting and other operations on the files (document data).

The client terminal 1003 is a computer having functions of creating, perusing and editing electronic documents, setting security policies, creating print jobs, etc. The image forming apparatus 1004 is configured as a so-called multi function peripheral having a scanner function, a printer function, and a communication function. In addition, the image forming apparatus 1004 has a box function of storing, for reutilization, intermediate data (document data converted into print data) in the image forming apparatus 1004.

Figure 2:
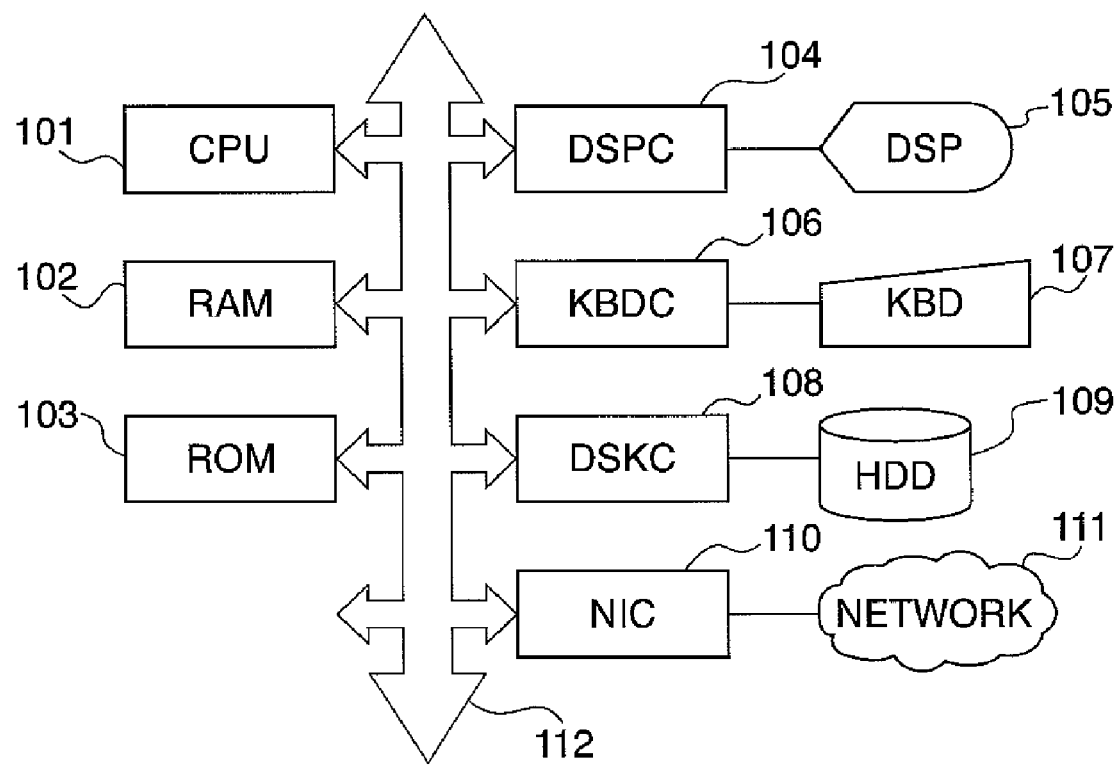
FIG. 2 is a view showing the construction of a computer for use as a client terminal or a first or second policy server shown in FIG. 1.

Computers for use as the first and second policy servers 1001, 1002 and the client terminal 1003 are each configured as shown for example in FIG. 2. In FIG. 2, reference numeral 101 denotes a CPU (central processing unit) for performing overall control of the computer, arithmetic processing, etc. Reference numeral 102 denotes a ROM (read only memory) in which a system boot program, a basic I/O program, character pattern data (character generator) corresponding to character codes, etc. are stored. Reference numeral 103 is a RAM (random access memory) for temporarily storing data for use in calculation by the CPU 101, calculation results, character pattern data strings converted for display from character codes, graphic data, image data, etc.

Reference numeral 104 denotes a display controller for reading out character pattern data strings or the like stored in the RAM 103 and for transmitting the same to the display unit 105 for being displayed thereon. The display unit 105 receives character pattern data strings, graphic data, and image data from the display controller 104, and displays the same on a display screen thereof. Reference numeral 106 denotes a keyboard controller for receiving key input data (character codes or control codes) from a keyboard 107 and for transmitting the same to the CPU 101.

Reference numeral 108 denotes a disk controller for controlling access to a hard disk unit 109. The hard disk unit 109 stores a character expansion processing program for reading out character pattern data and converting the same into bit-map data, a graphic expansion processing program for graphic data processing, and an image data processing program for image data processing. The hard disk unit 109 also stores an OS (operation program) and control programs for the below-described processes performed by the computer that functions as the first policy server 1001, the second policy server 1002, or the client terminal 1003.

Reference numeral 110 denotes a network interface card (NIC) for establishing connection for information exchange with other equipment on the network 111. The network 111 represents a computer network such as an intranet to which a large number of computers are connected via network interfaces. The network 111 includes the network 1005 shown in FIG. 1, and a LAN 1006 and a WAN 1007 described below with reference to FIG. 4.

Figure 3:
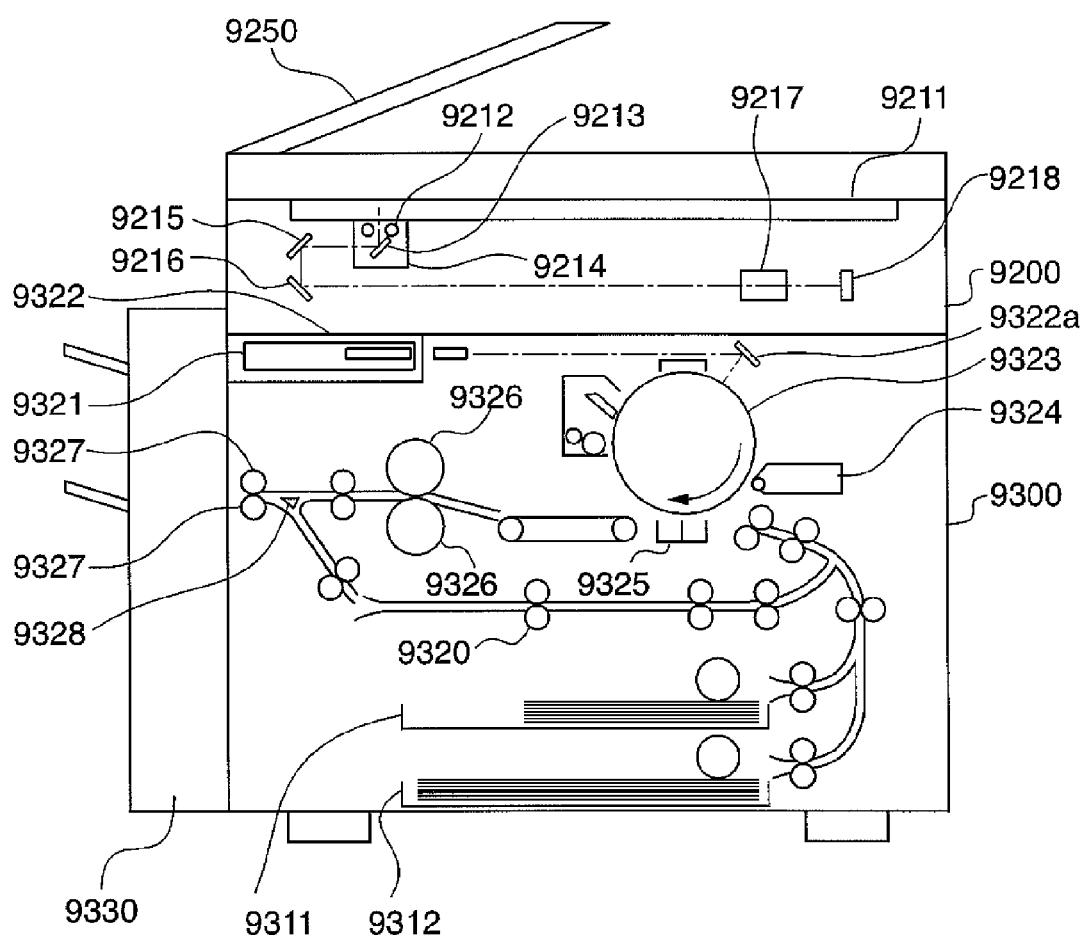
FIG. 3 is a schematic view showing the mechanical construction of an image forming apparatus (multi function peripheral) shown in FIG. 1.

FIG. 3 schematically shows the mechanical construction of the image forming apparatus 1004. As shown in FIG. 3, the image forming apparatus 1004 includes a scanner unit 9200 and a printer unit 9300.

The scanner unit 9200 has an original feeder 9250 installed thereon. The original feeder 9250 feeds originals onto a platen glass 9211 on a sheet-by-sheet basis. Upon completion of each original being read, the original feeder 9250 discharges the original from the platen glass 9211 to a discharge tray (not shown).

Under the control of a scanner control unit 2070 (see FIG. 4), described later, of the image forming apparatus 1004, a lamp 9212 of the scanner unit 9200 is tuned on and a moving unit 9213 starts to move when an original is fed onto the platen glass 9211. With the movement of the moving unit 9213, information (image) on the original fed onto the platen glass 9211 is read by optical scanning.

During the scan reading, light reflected from the original, i.e., image light representing the original image, is incident on a CCD image sensor device (hereinafter referred to as the CCD device) 9218 via mirrors 9214 to 9216 and a lens 9217. The CCD device 9218 photoelectrically converts the image light into an analog image signal. Then the CCD device 9218 converts the analog image signal into digital image data of predetermined bits, and outputs the digital image data to the controller unit 2000 (see FIG. 4) of the image forming apparatus 1004.

The printer unit 9300 includes a laser driver 9321. The laser driver 9321 drives a laser emitter 9322 in 6 accordance with image data input from the controller unit 2000, whereby laser light corresponding to the image data is emitted from the laser emitter 9322. While being deflected by a polygon mirror 9322a, the laser light is irradiated onto a photosensitive drum 9323, whereby an electrostatic latent image is formed on the photosensitive drum 9323. The electrostatic latent image is visualized into a toner image by supplying toner from a developing unit 9324.

On the other hand, image-recording sheets are fed from sheet feeding cassettes 9311, 9312. Specifically, recording sheets are picked up from the sheet feeding cassette 9311 or 9312 on a sheet-by-sheet basis. The picked-up recording sheet is fed through a conveyance path to between the photosensitive drum 9323 and a transfer unit 9325 in synchronism with irradiation timing of laser light. The transfer unit 9325 transfers the toner image formed on the photosensitive drum 9323 onto the fed recording sheet.

The recording sheet onto which the toner image has been transferred is conveyed by a conveyance belt to a pair of fixing rollers 9326 (i.e., a heating roller and a pressurizing roller). The recording sheet is pressed and heated by the fixing roller pair 9326, whereby the toner image on the recording sheet is fixed thereto. After passing through the fixing roller pair 9326, the recording sheet is discharged to a sheet discharging unit 9330 by a pair of sheet discharge rollers 9327. The sheet discharging unit 9330 includes a sheet aftertreatment apparatus for performing aftertreatment such as sorting and stapling.

In a case that a double-sided recording mode is set, the recording sheet conveyed to the sheet discharge roller pair 9327 is guided toward a refeeding conveyance path by a flapper 9328 with reverse rotation of the sheet discharge rollers 9327. Subsequently, the recording sheet reversed from front to back is refed to between the photosensitive drum 9323 and the transfer unit 9325 in the above-described timing. As a result, a toner image is transferred onto the back side of the refed recording sheet.

Figure 4:
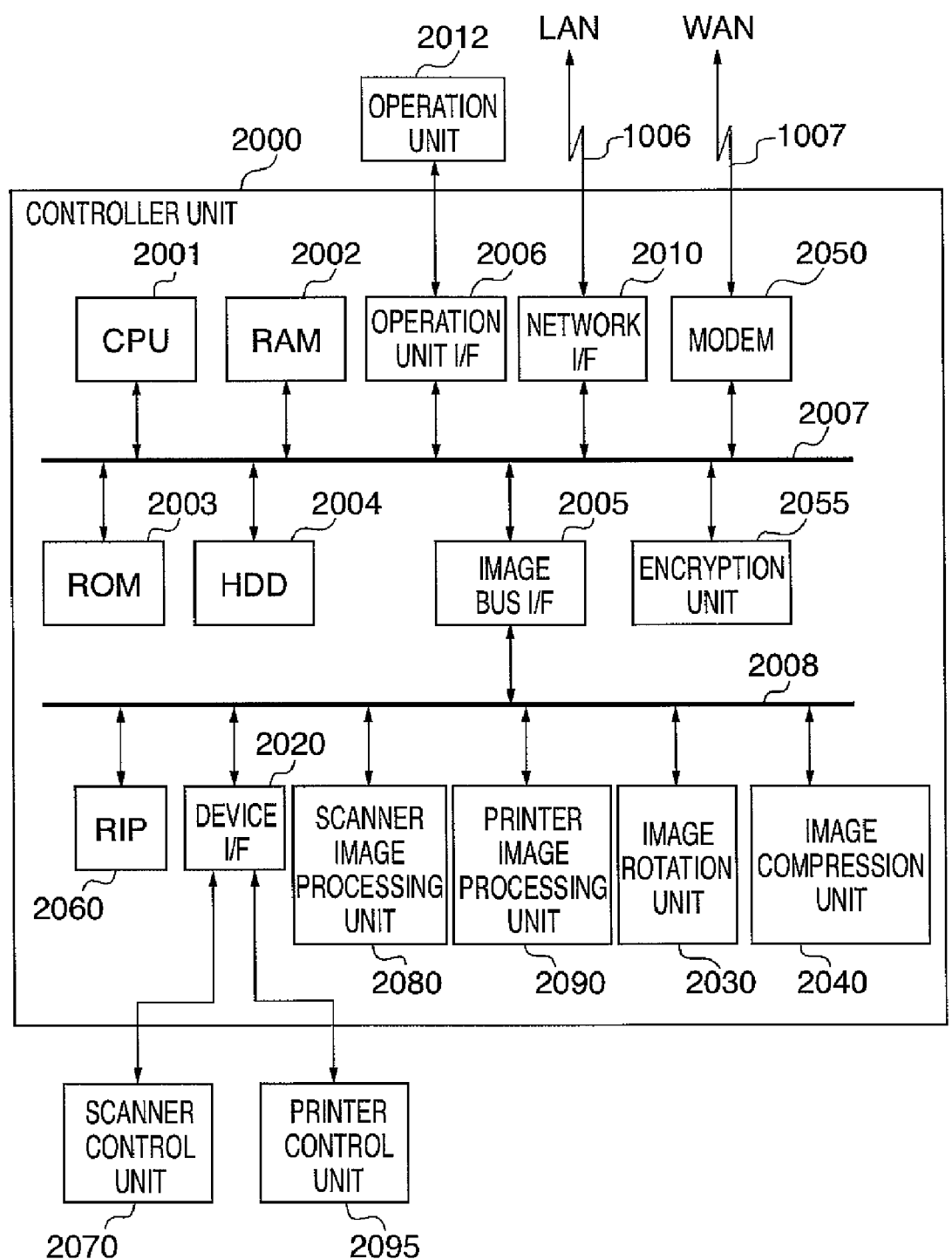
FIG. 4 is a block diagram showing the electrical functions of the image forming apparatus.

FIG. 4 shows in block diagram the electrical construction of the image forming apparatus 1004. The image forming apparatus 1004 includes the controller unit 2000 to which an operation unit 2012, a scanner control unit 2070, and a printer control unit 2095 are connected. The controller unit 2000 appropriately controls the scanner control unit 2070 and the printer control unit 2095 in accordance with commands input from the operation unit 2012, whereby a copy function is realized. Further, the controller unit 2000 establishes connection with a LAN 1006 and a public line (WAN) 1007 for transmission and reception of various data and commands to and from external apparatuses such as the client terminal 1003 and the first and second policy servers 1001, 1002.

The controller unit 2000 includes a system bus 2007 and an image bus 2008. The system bus 2007 and the image bus 2008 are connected together through an image bus I/F (image interface) 2005. Connected to the system bus 2007 are a CPU 2001, a RAM 2002, a ROM 2003, a hard disk unit (HDD) 2004, an operation unit I/F 2006, a network I/F 2010, a modem 2050, and an encryption unit 2055.

The CPU 2001 starts up the operation system (OS) using a boot program stored in the ROM 2003. Then, the CPU 2001 executes, on the OS, an application program (control program) stored in the HDD (hard disk drive) 2004 to thereby carry out various processing. The CPU 2001 uses the RAM 2002 as a work area.

The RAM 2002 provides the work area and an image memory area in which image data is temporarily stored. In the ROM 2003, a character generator is installed. In the HDD 2004, the OS, the application program, etc. are stored.

The operation unit I/F 2006 acts as an interface with the operation unit 2012 with touch panel, and outputs image data to be displayed on the operation unit 2012 to the unit 2012. The operation unit I/F 2006 transmits, to the CPU 2001, information and commands associated with operations at the operation unit 2012.

The network I/F 2010 is connected to the LAN 1006 and transmits and receives information and commands to and from external apparatuses connected to the LAN 1006. The modem 2050 transmits and receives information and commands to and from external apparatuses connected to the public line 1007.

To improve security, the encryption unit 2055 performs encryption processing on information such as documents or image data to be transmitted to an external apparatus. In the case of transmitting image data read by the scanner unit 9200 to the external apparatus, the image data per se is usually encrypted by the encryption unit 2055 before transmission. On the other hand, if, for example, image data read by the scanner unit 9200 is comprised only of characters and symbols, the image data may be converted into characters and symbol codes, which then may be encrypted by the encryption unit 2055 before transmission. The conversion to the characters and symbol codes can be carried out with the character generator stored in the ROM 2003.

To enable the first policy server 1001 to manage image data read by the scanner unit 9200 or character and symbol code strings associated therewith, the image data and the character and symbol code strings are each encrypted by the encryption unit 2055. Then, the encrypted data or string is converted by the CPU 2001 into a file with a file name, and the file name and an encryption key are transmitted to the first policy server 1001. The encrypted file can be stored in the hard disk unit 2004 for the purpose of reuse (box function).

The image bus I/F 2005 is a bus bridge for data structure conversion. The system bus 2007 is connected via the image bus I/F 2005 to the image bus 2008 that transfers image data at a high speed. The image bus 2008 is comprised of a PCI bus or an IEEE 1394 bus. Connected to the image bus 2008 are a raster image processor (RIP) 2060, a device I/F 2020, a scanner image processing unit 2080, a printer image processing unit 2090, an image rotation unit 2030, and an image compression unit 2040.

The RIP 2060 is a processor for developing PDL codes into a bitmap image. The device I/F 2020 to which the scanner control unit 2070 and the printer control unit 2095 are connected performs synchronous/asynchronous conversion of image data. The scanner image processing unit 2080 performs correction, modification, and editing on input image data.

The printer image processing unit 2090 performs printer correction, resolution conversion, or the like on print output image data. The image rotation unit 2030 carries out rotation of image data. The image compression unit 2040 carries out compression of multi-valued image data into JPEG data, compression of binary image data into JBIG, MMR, MH, or the like, and decompression thereof.

Figure 5:
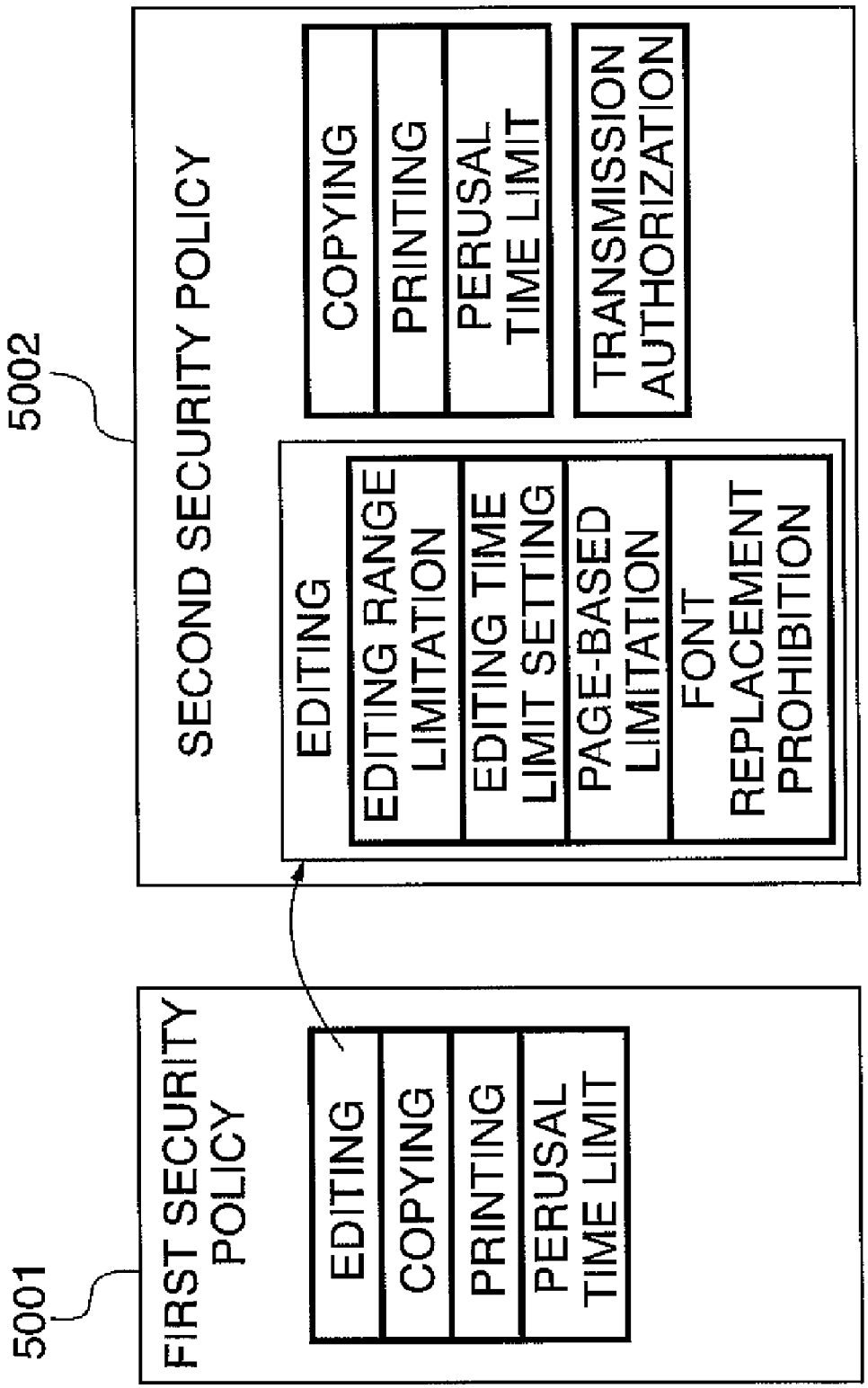
FIG. 5 is a view showing an example of security policy settings.

FIG. 5 shows an example of security policy settings. A first security policy 5001 is set for the first files described above. The first security policy 5001 includes items of operation authorizations such as authorizations for displaying, editing, and printing electronic documents (document data).

A second security policy 5002 is set for the second files. In addition to the items of the first security policy 5001, the second security policy 5002 can include items for expanding the first security policy 5001 and/or items relating to functions of the image forming apparatus 1004. For example, as the items for expanding the first security policy 5001, there may be mentioned an authorization for a change in print layout which is an expanded printing authorization, and an authorization for font replacement which is an expanded editing authorization. As the items relating to the functions of the image forming apparatus 1004, there may be mentioned an authorization for FAX transmission which is a transmission authorization.

Figure 6:
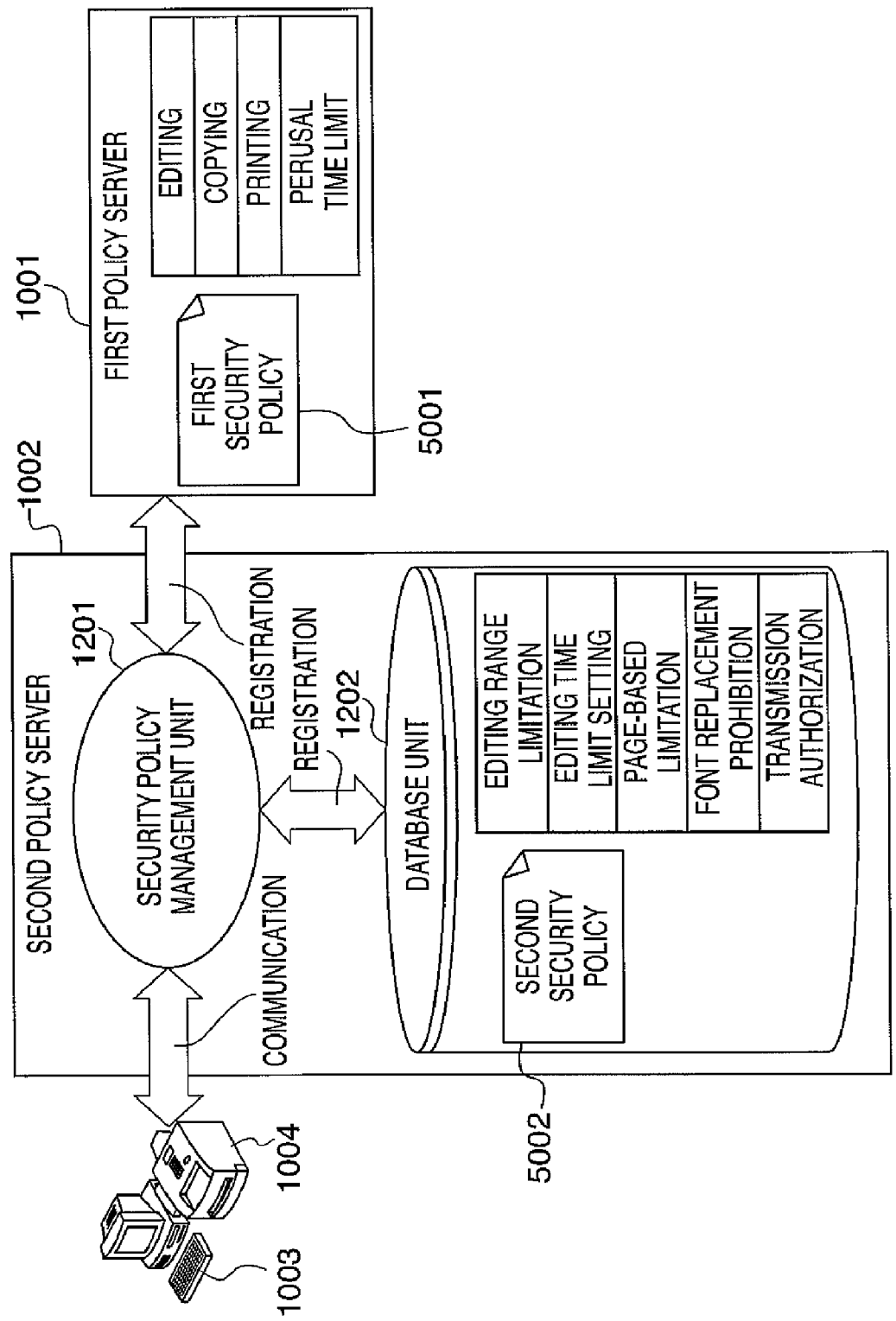
FIG. 6 is a view showing the functions of policy serves in a first embodiment of this invention.

FIG. 6 shows the functions of the policy servers in the first embodiment. The client terminal 1003 and the image forming apparatus 1004 access the second policy server 1002 to perform operations such as acquiring, registering, and changing the security policy. The second policy server 1002 includes a security policy management unit 1201 and a database unit 1202. In the database unit 1202, the second security policy 5002 for the second files (document data) is registered.

Upon receipt of a request for performing an operation relating to the first security policy 5001 from the client terminal 1003 or the image forming apparatus 1004, the security policy management unit 1201 communicates with the first policy server 1001 in order to meet the request. Similarly, when receiving a request for performing an operation relating to the second security policy 5002, the security policy management unit 1201 operates the database unit 1202 to meet the request.

To generate the second security policy 5002, the security policy management unit 1201 refers to the first security policy 5001 and sets initial values of relevant items. For example, if editing authorization is set to be prohibited in the first security policy 5001, the second security policy 5002 is initially set such that all the pages of the second files are prohibited from being edited.

If the first security policy 5001 or the second security policy 5002 is changed, the security policy management unit 1201 sets contents of relevant items of the first and second security policies 5001, 5002 in a manner in conjunction with one another. For example, when the setting of editing authorization in the first security policy 5001 is changed from "permission" to "prohibition", editing of all the pages is set to be prohibited in the second security policy 5002.

Figure 7:
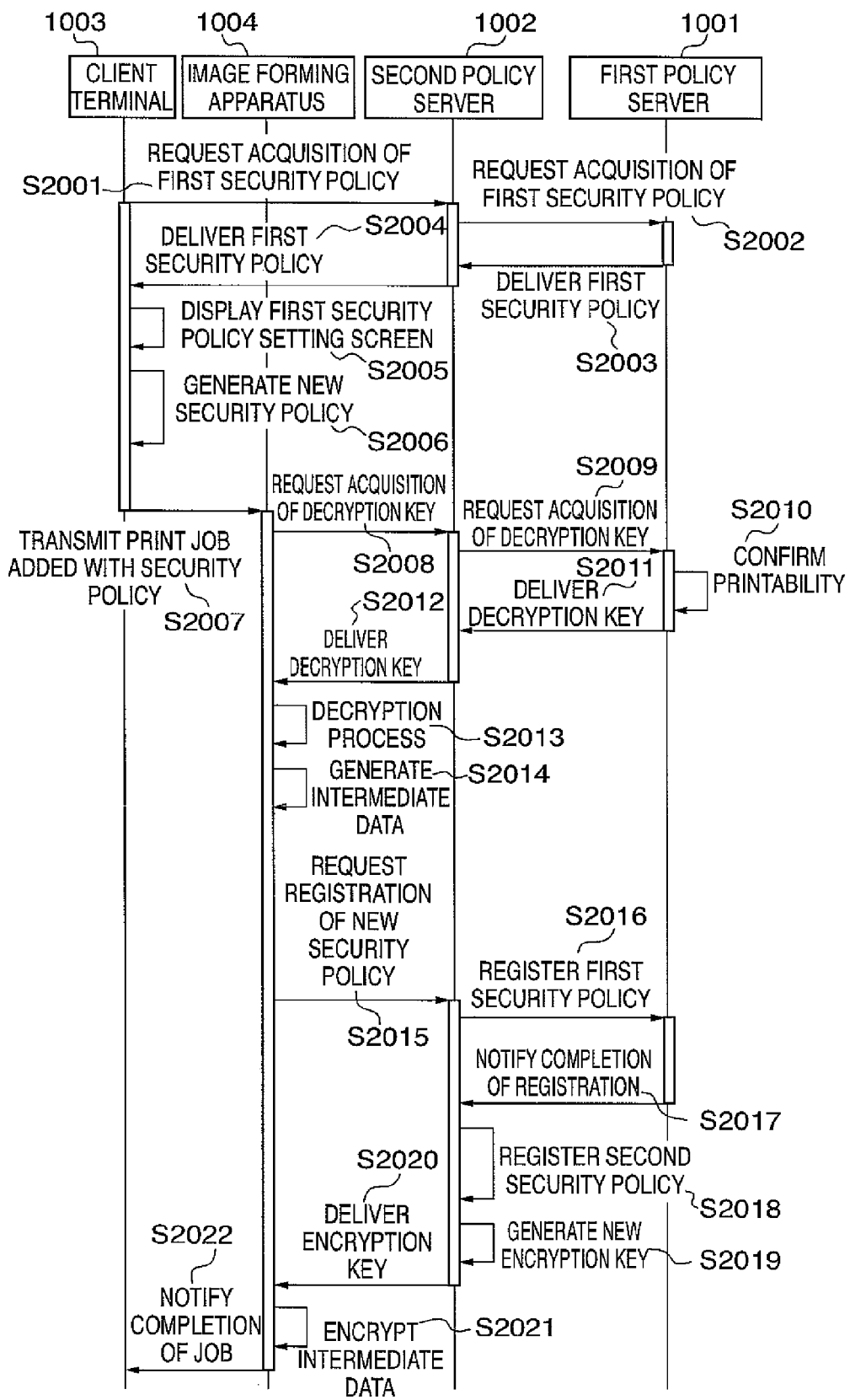
FIG. 7 is a sequence diagram showing an example of a printing process in the first embodiment.

FIG. 7 shows in sequence diagram the flow of a printing process in the first embodiment. In step S2001, the client terminal 1003 requests the second policy server 1002 to acquire the first security policy 5001. In step S2002, the second policy server 1002 requests the first policy server 1001 to acquire the first security policy 5001. In steps S2003 and S2004, the first security policy 5001 is delivered from the first policy server 1001 to the client terminal 1003 via the second policy server 1002.

In step S2005, the client terminal 1003 causes a printer driver to display a security policy setting screen to thereby encourage a user to input security policy setting information. In step S2006, the client terminal 1003 generates a new security policy based on the input security policy setting information. In step S2007, the client terminal 1003 delivers a print job added with the generated security policy to the image forming apparatus 1004.

In step S2008, the image forming apparatus 1004 requests the second policy server 1002 to acquire a decryption key. In step S2009, the second policy server 1002 requests the first policy server 1001 to acquire the decryption key. In step S2010, the first policy server 1001 determines whether or not a file (document data) to be decrypted using the requested decryption key can be printed.

If it is determined in step S2010 that the file can be printed, the decryption key is delivered from the first policy server 1001 to the image forming apparatus 1004 via the second policy server 1002 in steps S2011 and S2012. In step S2013, the image forming apparatus 1004 decrypts the encrypted document data. In step S2014, the image forming apparatus 1004 generates intermediate data for being printed.

In step S2015, the image forming apparatus 1004 requests the second policy server 1002 to register the new security policy. In step S2016, the second policy server 1002 registers the first security policy 5001 in the first policy server 1001. In step S2017, completion of the registration is notified. In step S2018, the second policy server 1002 registers the second security policy 5002 in the database unit 1202. In step S2019, the second policy server 1002 generates a new encryption key, and delivers the generated encryption key to the image forming apparatus 1004 in step S2020.

In step S2021, the image forming apparatus 1004 encrypts the intermediate data generated in step S2014. In step S2022, the image forming apparatus 1004 delivers a print job completion notification to the client terminal 1003, whereupon the process in FIG. 7 is completed. In the following, detailed procedures in the respective apparatuses will be described with reference to FIGS. 8 to 13.

Figure 8:
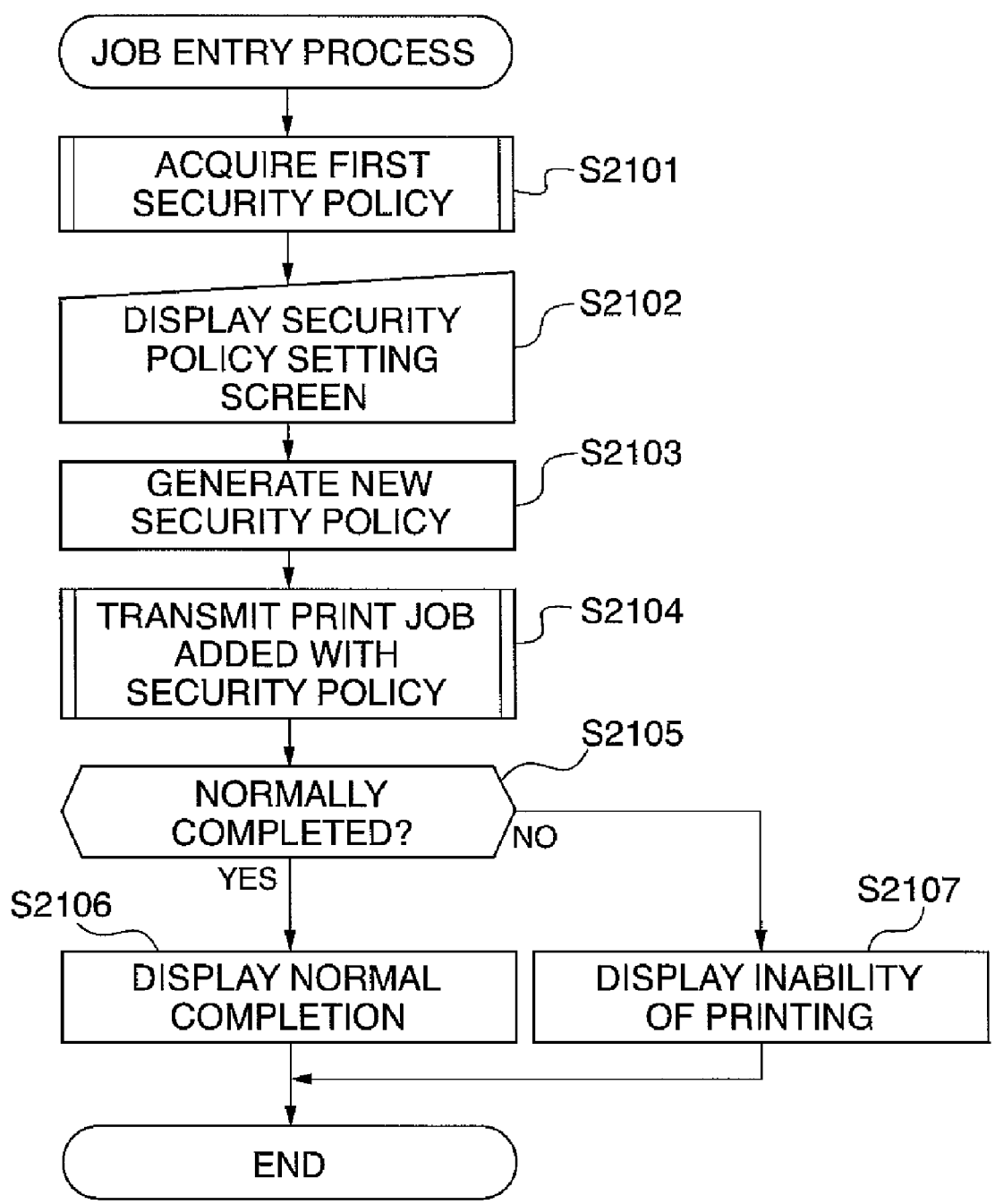
FIG. 8 is a flowchart showing a print job entry process performed by the client terminal in the printing process shown in FIG. 7.

FIG. 8 shows in flowchart a print job entry process performed by the client terminal 1003 in the printing process in FIG. 7. In the print job entry process, the client terminal 1003 generates a print job added with a new security policy, and delivers the resultant print job to the image forming apparatus 1004.

The client terminal 1003 acquires the first security policy 5001 via the second policy server 1002 (step S2101). At this time, initial values in the second security policy 5002 are set by the second policy server 1002 (see FIG. 10). Next, the client terminal 1003 displays, as a UI (user interface) screen of the printer driver, a security policy setting screen such as shown in FIGS. 15 and 16, to thereby encourage the user to input security policy setting information (step S2102).

FIG. 15 shows an example of a screen for setting the first security policy 5001, and FIG. 16 shows an example of a screen for setting the second security policy 5002. In the setting screen shown in FIG. 15, there can be set the name of the first security policy, an explanation of the first security policy, an expiration date, the way of inspection, an offline time, the presence of editing authorization, copying authorization, printing authorization, and offline authorization for an issuer and a reader of the first files, the necessity of encryption, and the way of dynamic watermark embedding. In the setting screen shown in FIG. 16, there can be set the necessity of color printing, the form of page layout, the necessity of double-sided printing, the presence of limitation on printing, a period for editing, a range of editing, the permission or prohibition of font replacement, and the permission or prohibition of use of transmission function.

Referring to FIG. 8 again, the client terminal 1003 generates a new security policy based on the security policy setting information input by the user (step S2103). Next, the client terminal 1003 enters (transmits) a print job added with the generated security policy to the image forming apparatus 1004 (step S2104) Processing performed by the image forming apparatus 1004 in response to the print job entry will be described later with reference to FIG. 9.

Upon the print job being transmitted, the image forming apparatus 1004 carries out the print job, and notifies the client terminal 1003 of a print job completion state such as normal completion of printing or inability of printing. The client terminal 1003 displays the content of the notification of print job completion state (steps S2105 to S2107), whereupon the print job entry process shown in FIG. 8 is completed.

Figure 9:
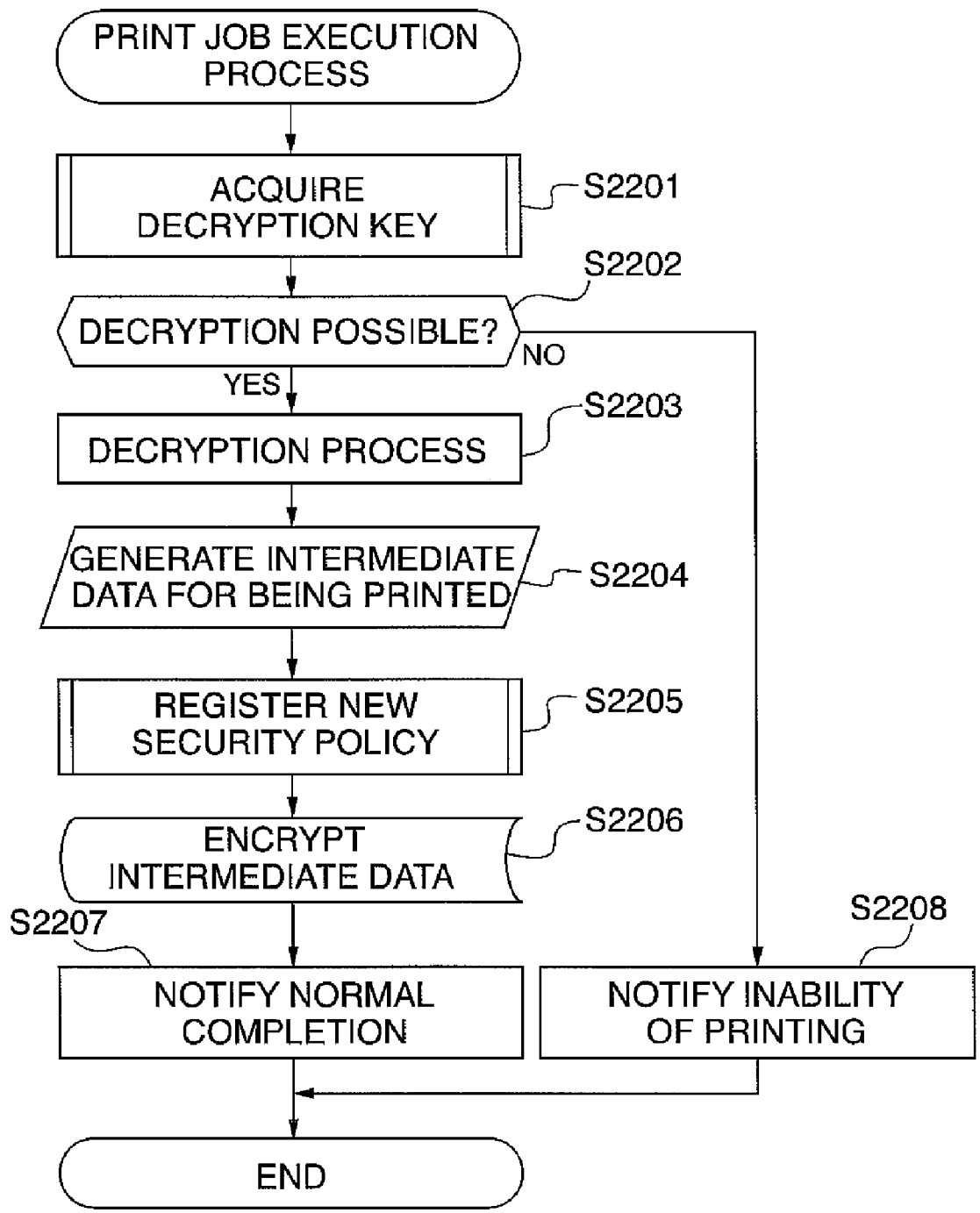
FIG. 9 is a flowchart showing a print job execution process performed by the image forming apparatus in the printing process shown in FIG. 7.

FIG. 9 shows in flowchart a print job execution process performed by the image forming apparatus 1004 in the printing process shown in FIG. 7. In the print job execution process, the image forming apparatus 1004 registers a security policy in the second policy server 1002 based on the print job delivered from the client terminal 1003, and generates encrypted intermediate data.

The image forming apparatus 1004 acquires from the second policy server 1002 a decryption key for decrypting document data relating to the print job (step S2201). At this time, if the document data is permitted to be printed, the second policy server 1002 delivers the decryption key relating to the document data to the image forming apparatus 1004. On the other hand, if the document data is not permitted to be printed, the second policy server 1002 notifies the image forming apparatus 1004 that the document data cannot be decrypted.

When notified from the second policy server 1002 that the document data cannot be decrypted (NO to step S2202), the image forming apparatus 1004 notifies the client terminal 1003 of the undecryptability of the document data (step S2208), whereupon the process shown in FIG. 9 is completed.

On the other hand, if the decryption key can be acquired (YES to step S2202), the image forming apparatus 1004 decrypts the document data relating to the print job using the acquired decryption key (step S2203). Then the image forming apparatus 1004 generates intermediate data for being printed from the decrypted document data and performs a printing process (step S2204).

Next, the image forming apparatus 1004 requests the second policy server 1002 to perform a process for registration of the security policy added to the print job (step S2205). In response to the request for registration, the second policy server 1002 delivers an encryption key for encrypting the intermediate data to the image forming apparatus 1004 (see FIG. 13).

The image forming apparatus 1004 encrypts the intermediate data using the encryption key, and stores the encrypted intermediate data into a hard disk drive or the like for reuse purpose (step S2206). Then the image forming apparatus 1004 informs the client terminal 1003 that the print job has normally been completed (step S2207), whereupon the process shown in FIG. 9 is completed.

Figure 10:
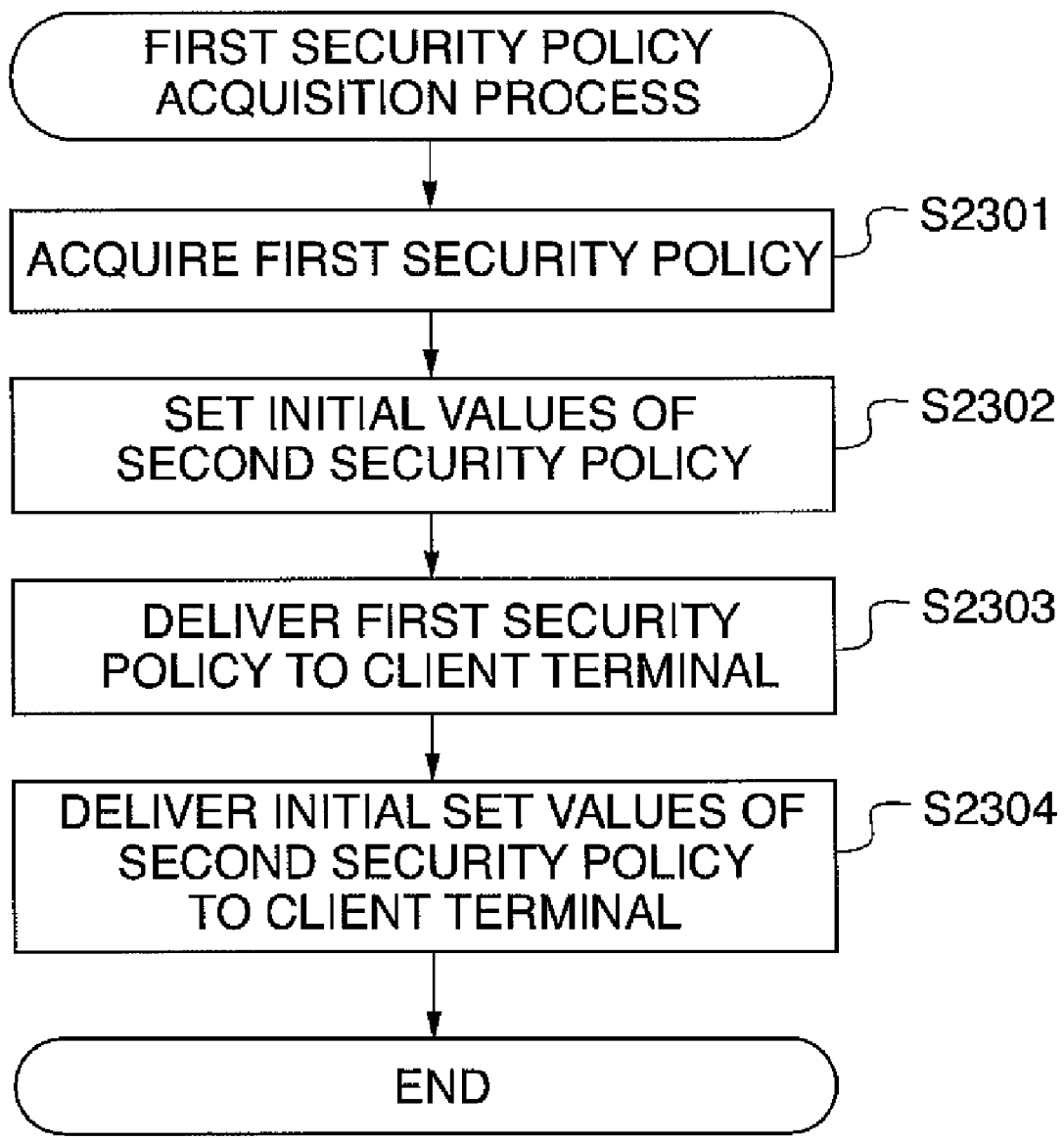
FIG. 10 is a flowchart showing a first security policy acquisition process performed by the second policy server in the printing process shown in FIG. 7.

FIG. 10 shows in flowchart a process for acquisition of the first security policy 5001 performed by the second policy server 1002 in the printing process shown in FIG. 7. The first security policy acquisition process in which the second policy server 1002 acquires the first security policy 5001 from the first policy server 1001 corresponds to the processing performed in step S2101 in FIG. 8.

The second policy server 1002 acquires the first security policy 5001 from the first policy server 1001 (step S2301). Next, the second policy server 1002 sets initial values of items in the second security policy 5002 relating to the acquired first security policy 5001 (step S2302).

Next, the second policy server 1002 delivers the first security policy 5001 acquired in step S2301 to the client terminal 1003 (step S2303). Then the second policy server 1002 delivers the initial values in the second security policy 5002 set in step S2302 to the client terminal 1003 (step S2304), whereupon the process shown in FIG. 10 is completed.

Figure 11:
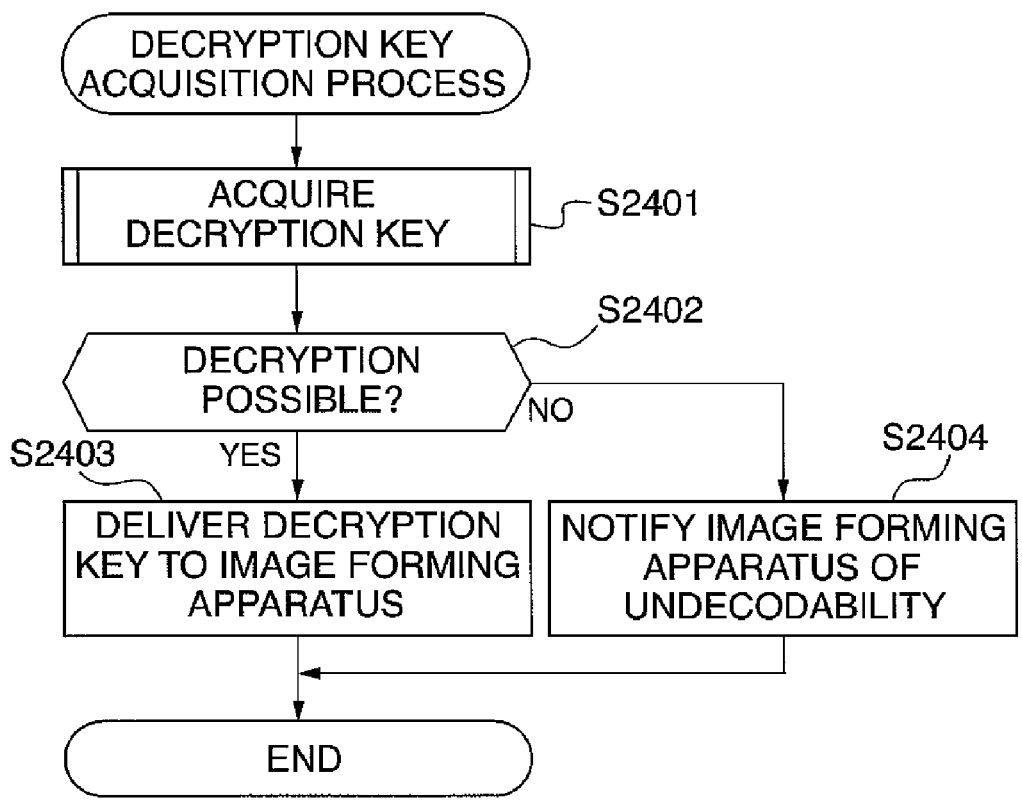
FIG. 11 is a flowchart showing a decryption key acquisition process performed by the second policy server in the printing process shown in FIG. 7.

FIG. 11 shows in flowchart a decryption key acquisition process performed by the second policy server 1002 in the printing process shown in FIG. 7. The decryption key acquisition process in which the second policy server 1002 acquires a decryption key for decrypting document data from the first policy server 1001 corresponds to the processing performed in step S2201 in FIG. 9.

The second policy server 1002 acquires the decryption key for decrypting document data relating to the print job from the first policy server 1001 (step S2401). At this time, if the document data is permitted to be printed, the decryption key is delivered from the first policy server 1001 to the second policy server 1002 (see FIG. 12). On the other hand, if the document data is not permitted to be printed, the first policy server 1001 notifies the second policy server 1002 that the document data cannot be decrypted (see FIG. 12).

If the decryption key can be acquired (YES to step S2402), the second policy server 1002 transmits the decryption key to the image forming apparatus 1004 (steps S2402 and S2403), whereupon the process shown in FIG. 11 is completed. On the other hand, if the document data is not decryptable (NO to step S2402), the second policy server 1002 notifies the image forming apparatus 1004 of the undecryptability of the document data (step S2404), whereupon the process of FIG. 11 is completed.

Figure 12:
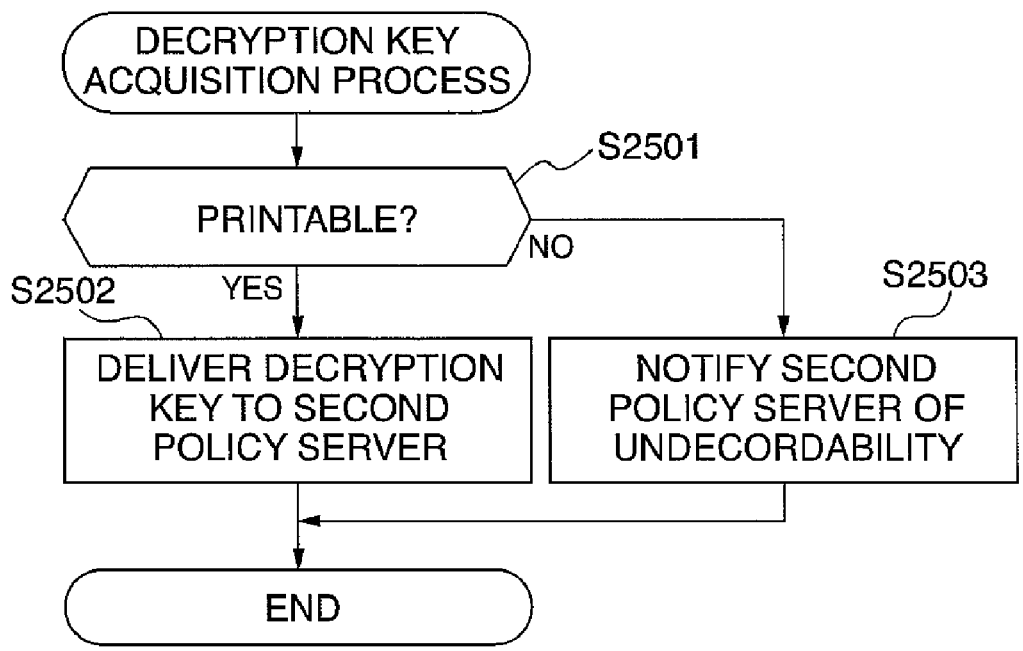
FIG. 12 is a flowchart showing a decryption key acquisition process performed by the first policy server in the printing process shown in FIG. 7.

FIG. 12 shows in flowchart a decryption key acquisition process performed by the first policy server 1001 in the printing process of FIG. 7, which corresponds to the processing performed in step S2401 of FIG. 11.

The first policy server 1001 refers to the first security policy 5001 for the decryption key (document data) relating to the acquisition request, and determines whether or not the document data is permitted to be printed (step S2501).

As a result, if it is determined that the document data is permitted to be printed, the first policy server 1001 delivers the decryption key relating to the document data to the second policy server 1002 (step S2502), whereupon the process of FIG. 12 is completed. On the other hand, if the document data is not permitted to be printed, the first policy server 1001 notifies the second policy server 1002 that the document data is undecryptable (step S2503), whereupon the process of FIG. 12 is completed.

Figure 13:
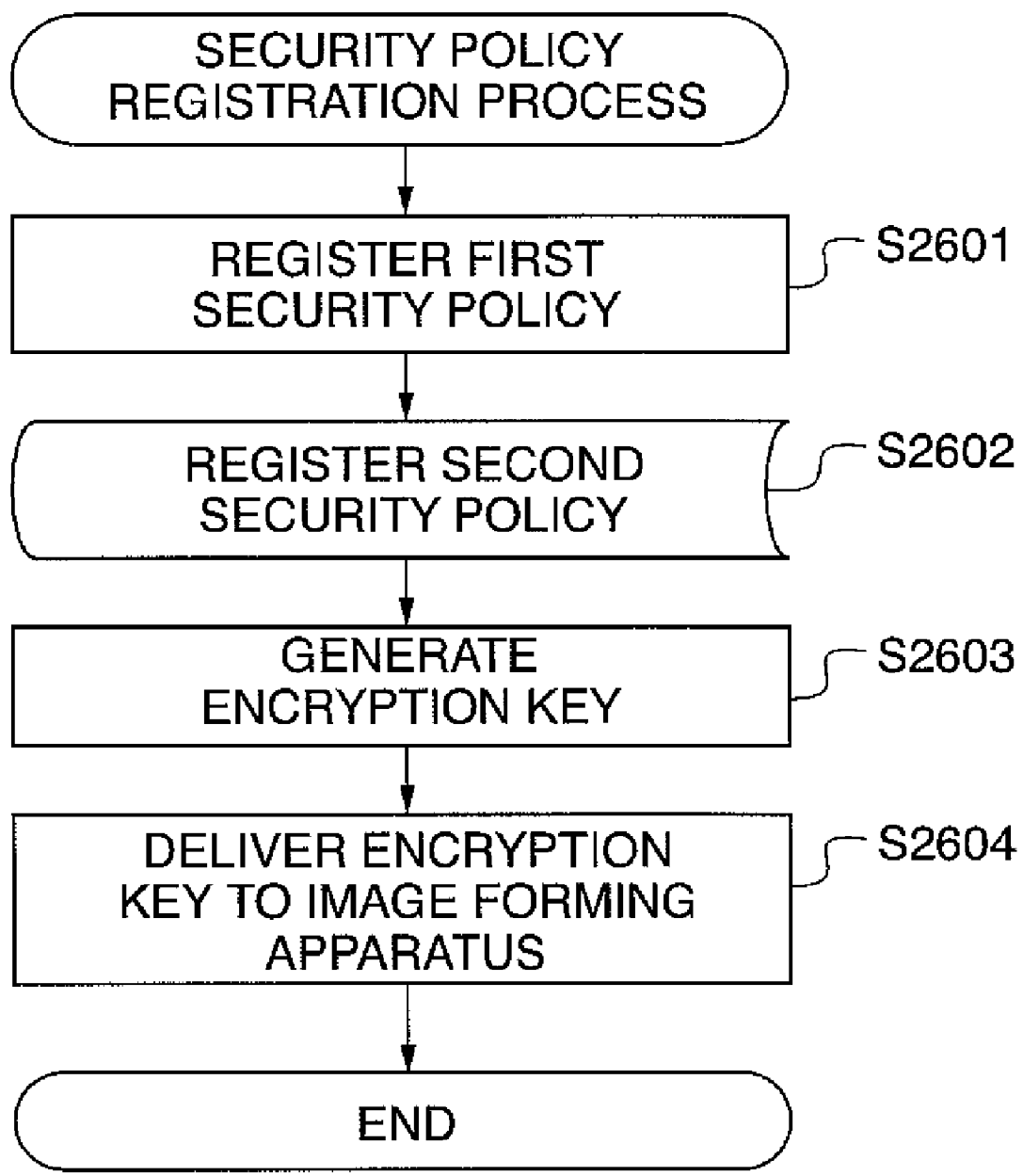
FIG. 13 is a flowchart showing a security policy registration process performed by the second policy server in the printing process shown in FIG. 7.

FIG. 13 shows in flowchart a security policy registration process performed by the second policy server 1002 in the printing process shown in FIG. 7. The security policy registration process in which the second policy server 1002 registers the security policy corresponds to the processing performed in step S2205 of FIG. 9.

The second policy server 1002 registers setting information of the first security policy 5001 in the first policy server 1001 (step S2601). Next, the second policy server 1002 registers setting information of the second security policy 5002 to the database unit 1202 (step S2602).

Then the second policy server 1002 generates an encryption key for encrypting intermediate data (step S2603), and delivers the generated encryption key to the image forming apparatus 1004 (step S2604), whereupon the process of FIG. 13 is completed.

Figure 14:
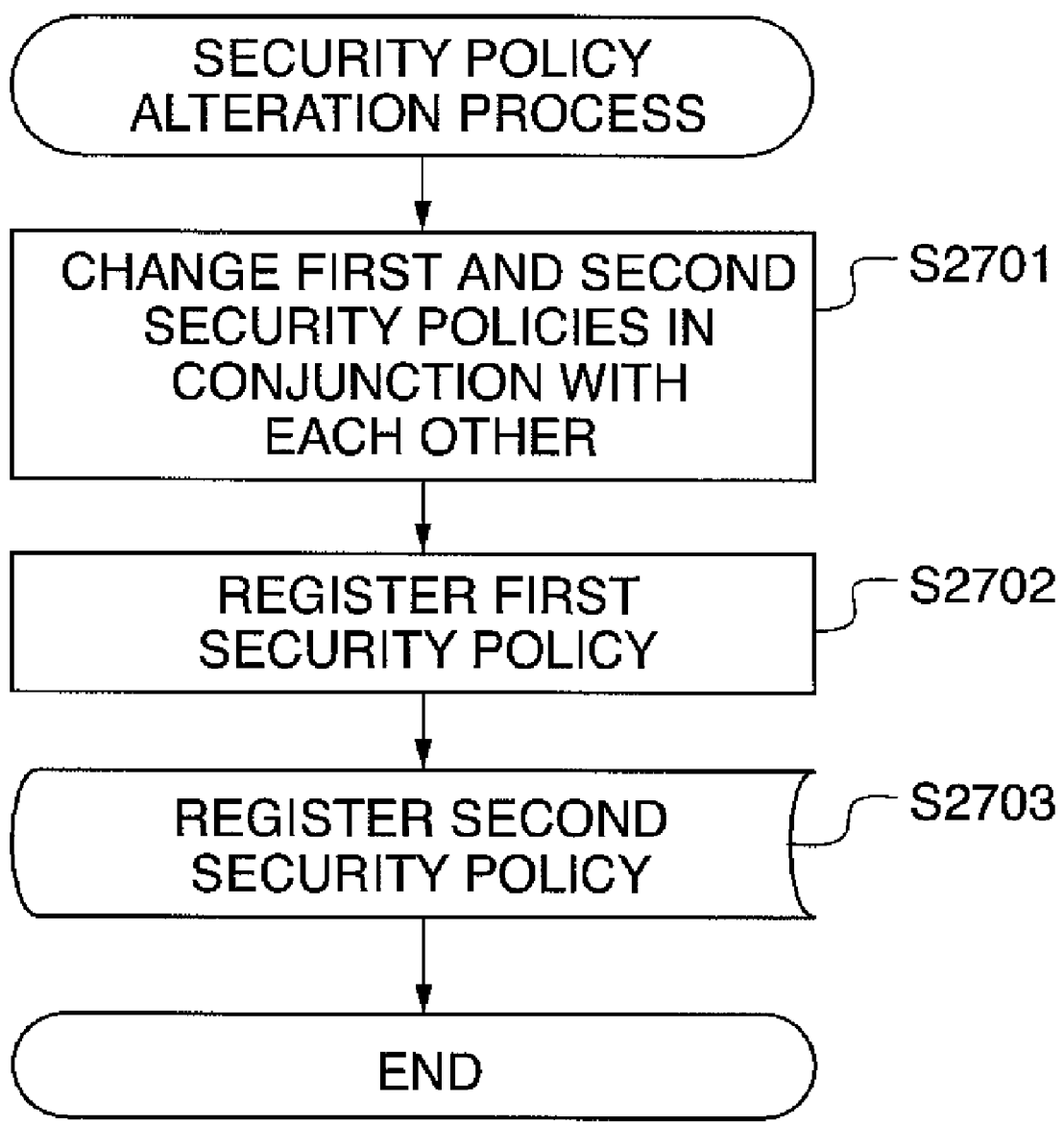
FIG. 14 is a flowchart showing a security policy alteration process performed by the second policy server.

FIG. 14 shows in flowchart a security policy alteration process performed by the second policy server 1002. The security policy alteration process is carried out when the user alters the first security policy 5001 or the second security policy 5002 by operating the client terminal 1003 or the image forming apparatus 1004.

When the operation of altering the first or second security policy is performed by the user, the security policy management unit 1201 of the second policy server 1002 changes the contents of mutually-related items of the first and second security policies 5001, 5002 in conjunction with one another (step S2701). If, for example, the editing authorization in the first security policy 5001 is changed from "permission" to "prohibition" by the alteration operation, the security policy management unit 1201 changes the second security policy 5002 such as to prohibit all the pages from being edited. Specifically, if information in a certain item of either the first or second security policy 5001 or 5002 is changed, pieces of information in one or more relevant items of the other security policy 5002 or 5001 are automatically changed without contradiction.

Next, the security policy management unit 1201 registers the setting information of the first security policy 5001 into the first policy server 1001 (step S2702). Next, the security policy management unit 1201 registers the setting information of the second security policy 5002 into the database unit 1202 (step S2703), whereupon the process of FIG. 14 is completed.

Second Embodiment

In the first embodiment, the second security policy 5002 is generated based on the security policy setting information input from the UI screen of the printer driver (the security policy setting screen of the client terminal). On the other hand, in a second embodiment, the security policy 5002 is generated based on a conversion rule from the first security policy 5001 to the second security policy 5002.

Figure 17:
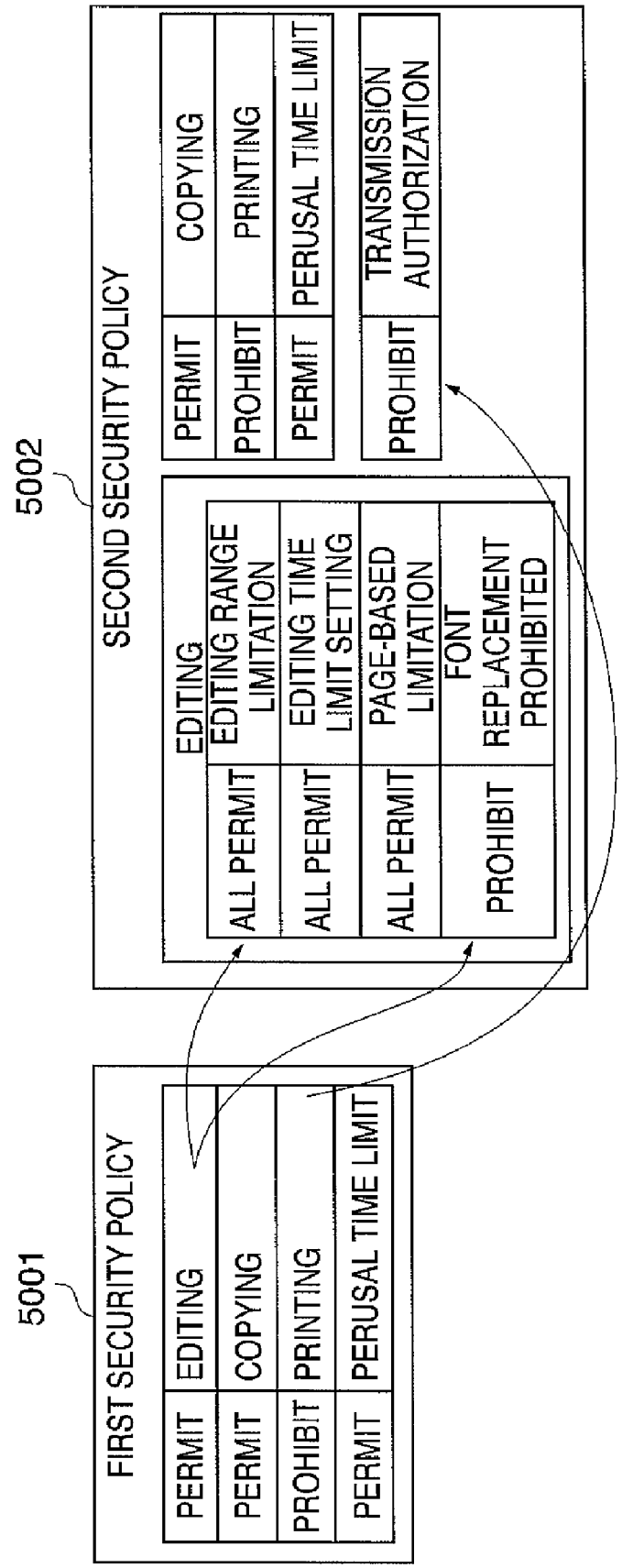
FIG. 17 is a view showing a rule of conversion from the first security policy to the second security policy in a second embodiment of this invention.

FIG. 17 shows an example of the conversion rule from the first security policy to the second security policy in the second embodiment. If, for example, editing is permitted in the first security policy 5001, editing is permitted also in the second security policy 5002. Even in such a case, if the editing function in the first security policy 5001 does not include a font replacement function, font replacement is prohibited in the second security policy 5002.

If printing is prohibited in the first security policy 5001, FAX transmission necessarily associated with the printing is prohibited in the second security policy 5002. By creating the conversion rule in the above described manner, user's input operations can be omitted and the second security policy 5002 can be generated with ease.

Third Embodiment

In the first embodiment, the second security policy 5002 is generated with reference to the first security policy 5001. On the other hand, in a third embodiment, the second security policy 5002 is generated without reference to the first security policy 5001.

In the third embodiment, the client terminal 1003 is able to generate the second security policy 5002 without accessing the second policy server 1002. Since the first security policy 5001 is not referred to, the second security policy 5002 is generated independently of the first security policy 5001.

Fourth Embodiment

In the first embodiment, the second security policy 5002 is generated based on security policy setting information input from the UI screen of the printer driver. On the other hand, in a fourth embodiment, the second security policy 5002 is generated based on security policy setting information input from a remote UI screen (remote user interface screen) of the image forming apparatus 1004.

In the following, a description will be given of a remote UI. The remote UI is a function of externally acquiring and setting information such as the status of the image forming apparatus 1004 or a function of causing the image forming apparatus 1004 to perform an operation of printing, transmission (Universal-Send), etc. The user can use the remote UI function by accessing the image forming apparatus 1004 from the client terminal 1003 using a Web browser or the like.

In the fourth embodiment, the security policy setting information is input from the remote UT. Thus, the client terminal 1003 is capable of generating the second security policy 5002 without accessing the second policy server 1002.

Figure 18:
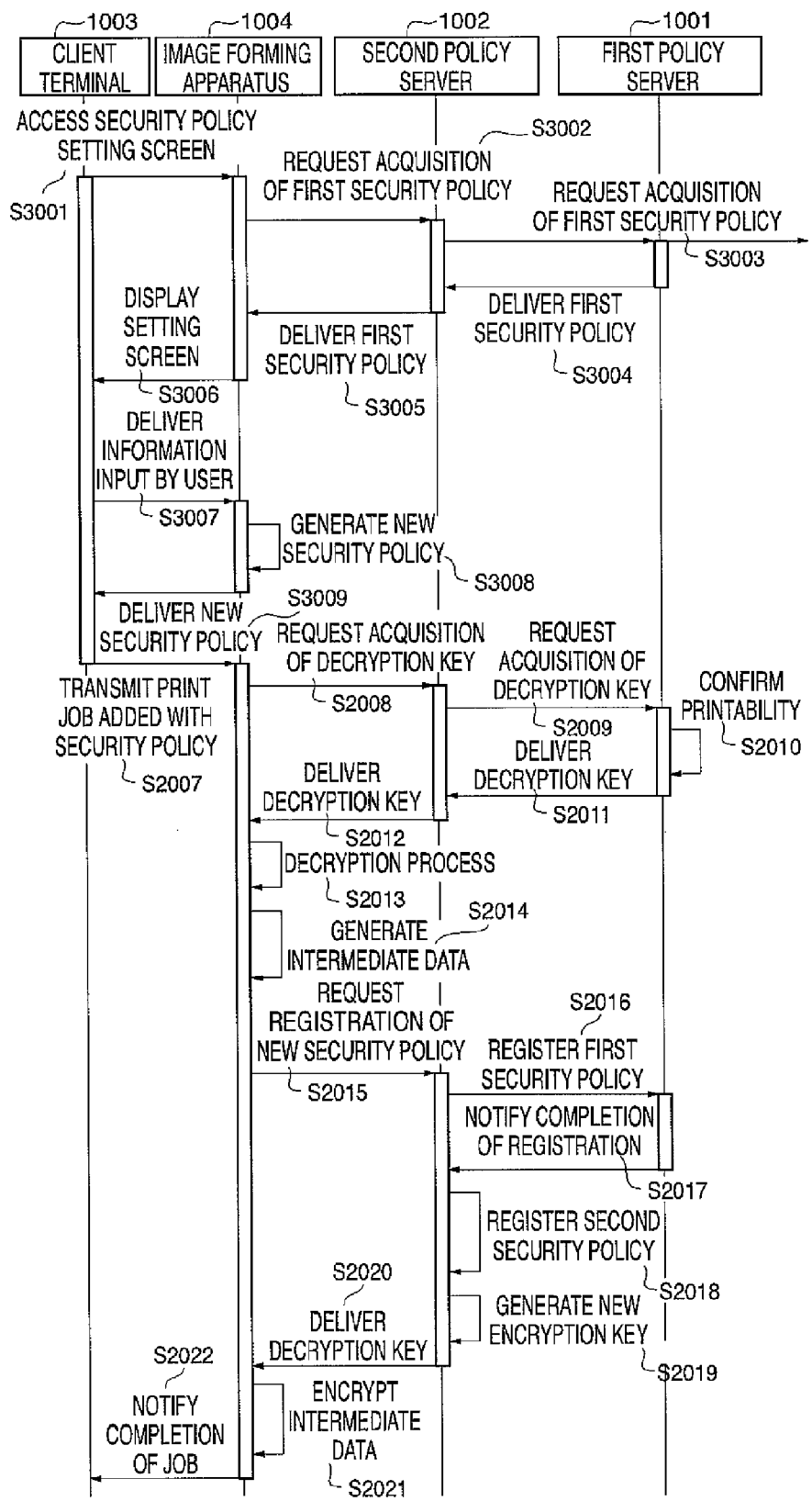
FIG. 18 is a sequence diagram showing an example of a printing process in a fourth embodiment of this invention.

FIG. 18 shows in sequence diagram the flow of a printing process in the fourth embodiment. In step S3001, the client terminal 1003 accesses the remote UI on the image forming apparatus 1004 for the second policy server 1002. In step S3002, the image forming apparatus 1004 requests the second policy server 1002 to acquire the first security policy 5001.

In step S3003, the second policy server 1002 requests the first policy server 1001 to acquire the first security policy 5001. In steps S3004 and S3005, the first security policy 5001 is delivered from the first policy server 1001 to the image forming apparatus 1004 via the second policy server 1002. In step S3006, the image forming apparatus 1004 displays the security policy setting screen on the remote UI, thereby encouraging the user to input the security policy setting information. The remote UI, i.e., the security policy setting screen, is displayed on the display unit (DSP 105) of the client terminal 1003.

In step S3007, the client terminal 1003 delivers the information input by the user to the image forming apparatus 1004. In steps S3008 and S3009, the image forming apparatus 1004 generates a new security policy based on the input security policy setting information, and delivers the new security policy to the client terminal 1003. Subsequently, the same processing as the processing performed in step S2007 and the subsequent steps is carried out.

Figure 19:
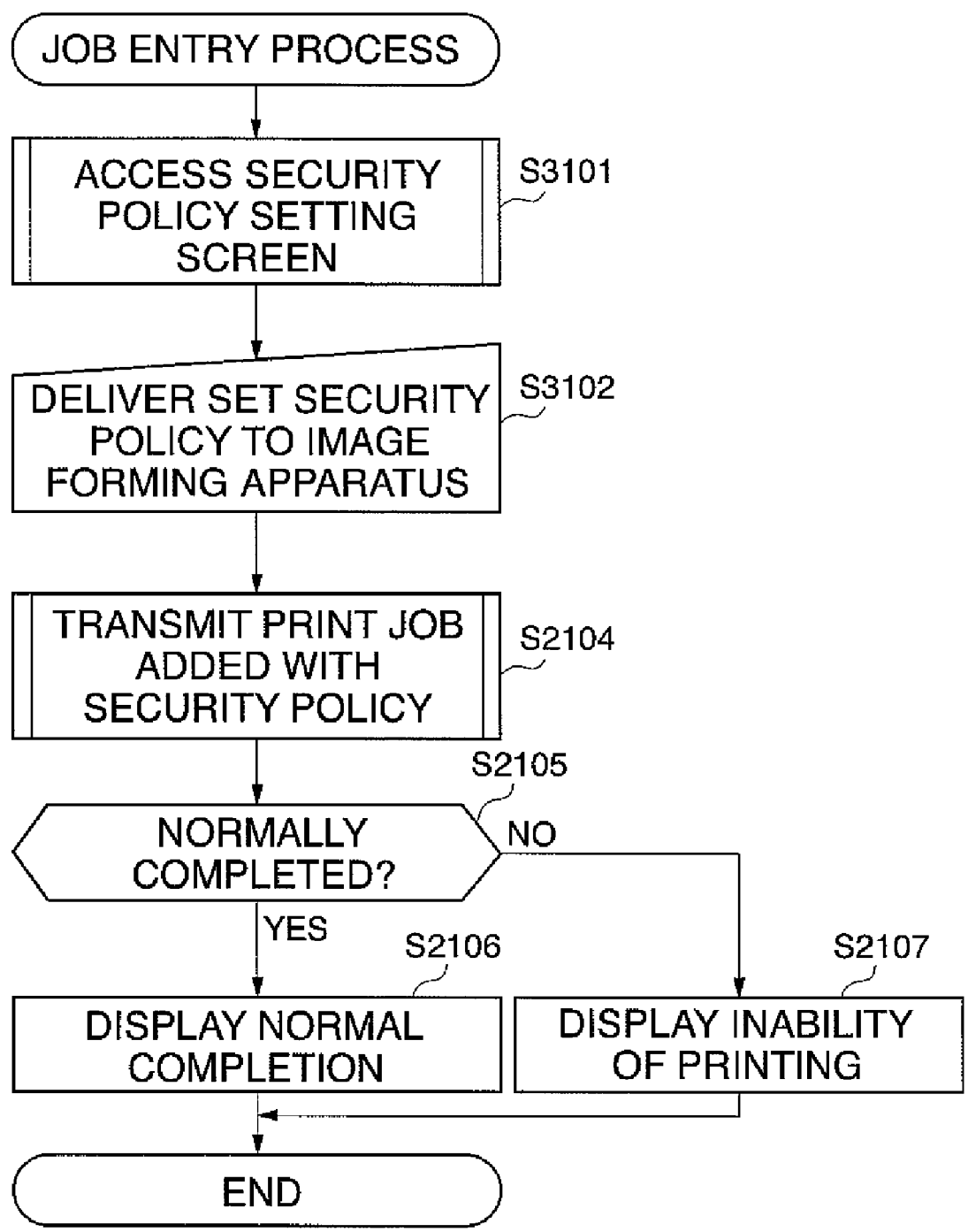
FIG. 19 is a flowchart showing a print job entry process performed by the client terminal in the printing process shown in FIG. 18.

FIG. 19 shows in flowchart a print job entry process performed by the client terminal in the printing process shown in FIG. 18. In the print job entry process, the client terminal 1003 generates a print job added with a new security policy, and delivers the print job to the image forming apparatus 1004.

The client terminal 1003 accesses the remote UI of the image forming apparatus 1004, and displays the security policy setting screen on the DSP 105 of the client terminal 1003 (step S3101). Next, the client terminal 1003 delivers the security policy setting information input at the security policy setting screen to the image forming apparatus 1004 (step S3102). The image forming apparatus 1004 generates a new security policy based on the input security policy setting information, and sends the new security policy back to the client terminal 1003.

In steps S2104 to S2107, the same processing as the processing performed in steps S2104 to S2107 in FIG. 8 is carried out. An explanation thereof is omitted.

Figure 20:
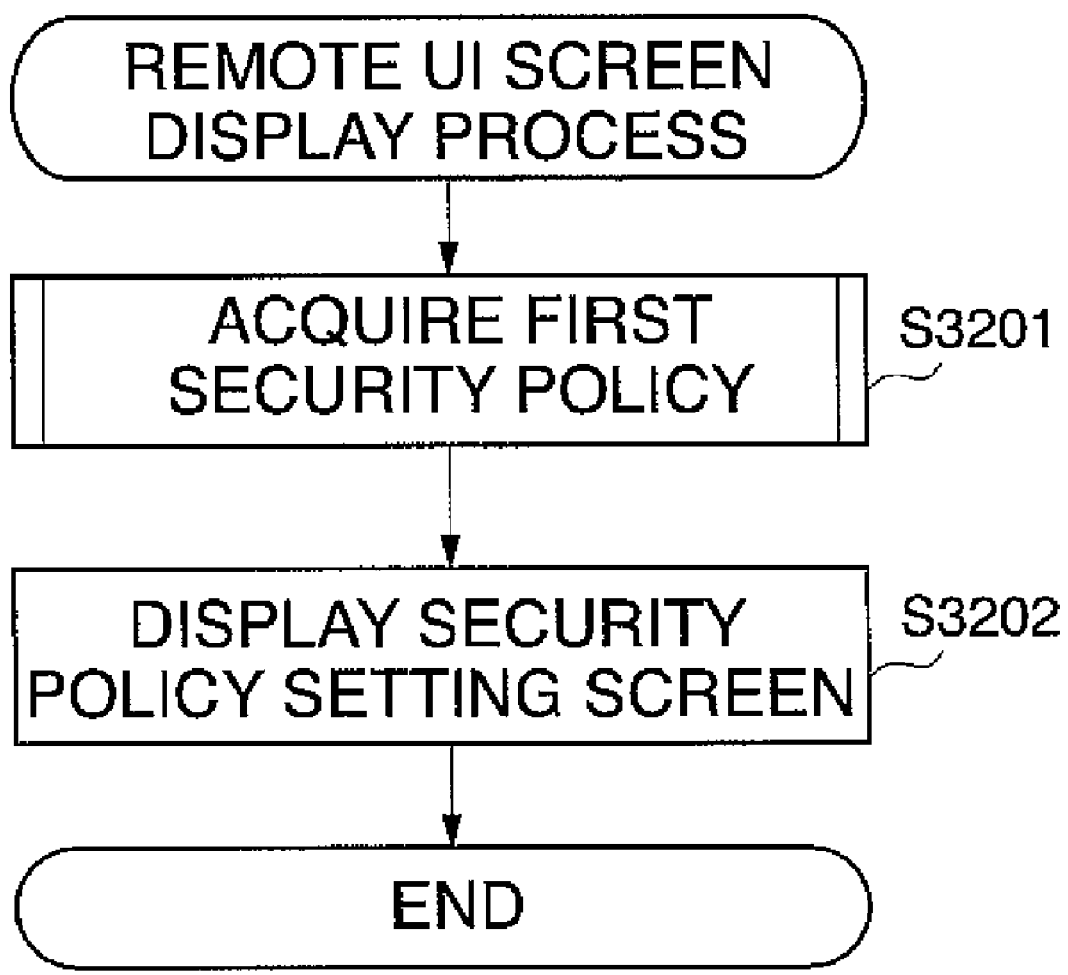
FIG. 20 is a flowchart showing a remote UI screen display process in the printing process shown in FIG. 18.

FIG. 20 shows in flowchart a remote UT screen display process in the printing process shown in FIG. 18. In the remote UI screen display process corresponding to the process performed in step S3101 of FIG. 19, the image forming apparatus 1004 displays the security policy setting screen in accordance with a request from the client terminal 1003.

The image forming apparatus 1004 acquires the first security policy 5001 from the second policy server 1002 (step S3201). At this time, initial values of the second security policy 5002 are set by the second policy server 1002. Next, the image forming apparatus 1004 causes the security policy setting screen to be displayed on the DSP 105 of the client terminal 1003 (step S3202), whereupon the process shown in FIG. 20 is completed.

In the above, various embodiments have been described. The present invention is applicable to a system comprised of plural pieces of equipment and also applicable to a system comprised of a single piece of equipment. For example, there may be mentioned a scanner, a printer, a PC, a copying machine, a multi function peripheral, and a facsimile machine.

It is to be understood that the present invention may be accomplished by supplying, directly or from a remote location, a system or an apparatus with a software program that realizes the functions of the above described embodiments and by causing a computer in the system or the apparatus to read and execute the supplied program code.

In that case, the program code installed into the computer to realize the functions and processing of this invention by the computer realizes the present invention. Thus, the computer program itself that realizes the functions and processing constitutes the present invention. In that case, the software program may have any form such as an object code, a program for being executed by an interpreter, script data for being supplied to the OS so long as it has a function of program.

Examples of a storage medium for supplying the program include a flexible disk, a hard disk, an optical disk, a magnetic-optical disk, an MO, a CD-ROM, a CD-R, a CD-RW, etc. As the storage medium, there may also be mentioned a magnetic tape, a nonvolatile memory card, a ROM, a DVD (DVD-ROM, DVD-R), and the like.

Further, the program may be downloaded from a web site on the Internet/intranet using a browser of a client computer. Specifically, the computer program of this invention or a compressed file having an automatic installation function may be downloaded into a storage medium such as a hard disk.

Further, the present invention can be realized by dividing program code constituting the program into plural files, and downloading the respective files from different web sites. Therefore, a WWW server from which the program file that causes a computer to realize the functional processing of this invention is downloaded by plural users can constitute the present invention.

Further, the program of the present invention can be encrypted and stored in a storage medium such as a CD-ROM for distribution to users. In that case, each user matching a predetermined condition may be permitted to download key information for decryption from a web site via the Internet/intranet, decrypt the encrypted program using the key information, and execute the program to install the program into a computer.

Further, it is to be understood that the functions of the above described embodiments may be accomplished by a computer by executing the read-out program code. An OS or the like running on the computer can perform a part or all of the actual processing in accordance with instructions given by the program. Of course, in that case, the functions of the embodiments can also be realized.

Further, it is to be understood that the functions of the above described embodiments may be accomplished by writing a program read out from the storage medium into a memory provided on a function expansion board inserted into a computer or a memory provided in a function expansion unit connected to the computer. Based on instructions of the program, a CPU or the like provided in the expansion board or the expansion unit can perform a part or all of the actual operations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-173089, filed Jun. 29, 2007 which is hereby incorporated by reference herein in its entirety.

What is claimed is:

1. An information processing apparatus configured to communicate with a policy server that manages a first security policy on at least one first file, the information processing apparatus comprising:
a management unit configured to manage a second security policy on at least one second file;
a first return unit configured, in response to acceptance of an acquisition request from a requestor for acquisition of the first security policy on the first file, to make a request to the policy server to acquire the first security policy, and configured to send back to the requestor the first security policy sent back to said first return unit from the policy server; and
a second return unit configured, in response to acceptance of a request from the requestor for acquisition of the second security policy on the second file, to acquire the second security policy from said management unit and send the acquired second security policy back to the requestor;
wherein the management unit, the first return unit and the second return unit comprise one or more hardware processors.

2. The information processing apparatus according to claim 1, further comprising:
a setting unit configured to set the second security policy on the second file, the second security policy being able to be managed by said management unit and the second file being obtained by being converted from the first file on which the first security policy is set;
wherein the setting unit comprises the one or more hardware processors.

3. The information processing apparatus according to claim 2, wherein said setting unit sets the second security policy on the second file, the second security policy corresponding to the first security policy set on the first file.

4. The information processing apparatus according to claim 2, wherein in a case where the first security policy set on the first file is changed, said setting unit changes the second security policy set on the second file in conjunction with a change in the first file.

5. The information processing apparatus according to claim 2, further comprising:

an alteration unit adapted to change the second security policy set on the second file; and a request unit configured, in response to the second security policy being changed by said alteration unit, to request said policy server to change the first security policy on the first file, corresponding to the second file, in conjunction with a change in the second security policy;

wherein the alteration unit and the request unit comprise the one or more hardware processors.

6. The information processing apparatus according to claim 2, wherein the information processing apparatus is able to communicate with an image forming apparatus, and further comprises a reception unit configured to receive from the image forming apparatus the second file generated by being converted from the first file in the image forming apparatus;

wherein the reception unit comprises the one or more hardware processors.

7. The information processing apparatus according to claim 1, wherein each of the first security policy and the second security policy includes pieces of information representing a plurality of different types of operation authorities on at least one file.

8. The information processing apparatus according to claim 7, wherein the pieces of information included in the second security policy and representing the operation authorities on the at least one file are made to correspond to one of the types of operation authorities included in the first security policy.

9. An information management method for an information processing apparatus configured to be able to communicate with a policy server that manages a first security policy on at least one first file, comprising:

a management step of managing, by the information processing apparatus, a second security policy on at least one second file;

a first return step of, in response to acceptance of an acquisition request from a requestor for acquisition of the first security policy on the first file, making a request, by the information processing apparatus, to the policy server to acquire the first security policy, and sending back, by the information processing apparatus, to the requestor the first security policy sent back from the policy server in response to the request; and a second return step of, in response to acceptance, by the information processing apparatus, of an acquisition request from the requestor for acquisition of a second security policy on the second file, acquiring, by the information processing apparatus, the second security policy managed in said management step and sending, by the information processing apparatus, the acquired second security policy back to the requestor.

10. A non-transitory computer-readable storage medium that, when executed by a computer, causes the computer to carry out an information management method for an information processing apparatus configured to be able to communicate with a policy server that manages a first security policy on at least one first file, the information management method comprising:

a management step of managing a second security policy on at least one second file;

a first return step of, in response to acceptance of an acquisition request from a requestor for acquisition of the first security policy on the first file, making a request to the policy server to acquire the first security policy, and sending back to the requestor the first security policy sent back from the policy server in response to the request; and a second return step of, in response to acceptance of an acquisition request from the requestor for acquisition of the second security policy on the second file, acquiring the second security policy managed in said management step and sending the acquired second security policy back to the requestor.

* * * * *